United States Patent [19]

Wang

[11] 4,014,666
[45] Mar. 29, 1977

[54] SEPARATION OF GASES

[75] Inventor: Chia-Gee Wang, Peekskill, N.Y.

[73] Assignee: Massachusetts Institute of Technology, Cambridge, Mass.

[22] Filed: Nov. 29, 1974

[21] Appl. No.: 528,128

Related U.S. Application Data

[63] Continuation-in-part of Ser. No. 514,679, Oct. 15, 1974, abandoned.

[52] U.S. Cl. .................................. 55/17; 55/405; 55/407
[51] Int. Cl.² ....................................... B01D 45/14
[58] Field of Search .................... 55/17, 405–408, 55/472, DIG. 13; 210/364

[56] References Cited

UNITED STATES PATENTS

| | | | |
|---|---|---|---|
| 3,299,616 | 1/1967 | Lucas | 55/17 |
| 3,320,722 | 5/1967 | Lucas | 55/17 |
| 3,362,131 | 1/1968 | Becker | 55/17 |
| 3,710,279 | 1/1973 | Ashkin | 55/17 X |

Primary Examiner—John Adee
Attorney, Agent, or Firm—Ladas, Parry, Von Gehr, Goldsmith & Deschamps

[57] ABSTRACT

An apparatus and process for separating gaseous mixtures of molecules of different mass in which a rotating means is caused to eject a contiguous plurality of successive groups of molecules into an evacuated space to form a continuous stream of said mixture; the molecules of each said group of molecules are allowed to move in accordance with their thermal velocities for a predetermined period of time following ejection, thereby to allow each said group of molecules to form a generally spherical configuration the outer radius of which will be enriched, in molecules of lighter mass, relative to lesser radii; and a collector means co-rotating with said rotating means is used to collect molecules, which have been allowed to move for said predetermined period of time in accordance with their thermal velocities, from at least one desired portion of said stream.

11 Claims, 10 Drawing Figures

SEPARATION OF GASES

This application is a continuation-in-part of application Ser. No. 514,679 filed Oct. 15, 1974 now abandoned.

This invention relates to a process and apparatus for the separation of mixtures of gases having molecules of different mass. The invention is particularly, though not exclusively, suitable for the separation of gaseous isotopes.

Although as described herein the present invention is applied to the separation of isotopes of uranium hexaflouride ($UF_6$), it will be appreciated that the invention is suitable for separating isotopes of any gas or molecules of different masses in any mixture of gases.

At the present time separation of gaseous isotopes is achieved primarily by a diffusion process which has the disadvantage of a low separation constant with the result that high purity of separated isotopes is achieved only by the use of a large plurality of separating operations. Methods of separating isotopes, and in particular, methods of separating uranium isotopes have been extensively studied (see, for example, "Report of Uranium Isotope Separation, Review (of) Ad Hoc Committee" Oak Ridge Report ORO-694 June, 1972, by Benedict et al. and "Diffusion Separation Methods", Encyclopedia of Chemical Tehcnology, 2nd Ed. Interscience Publishers, 1965 by von Halle et al.) and this has included consideration of a "time of flight" process to which the present invention is related. Prior to the present invention no practical method of isotope separation has been proposed in which the design of the apparatus to carry out the method can be varied to alter the separation constant, a separation constant for each operational stage as high as that of the present invention is possible, separation of any gaseous mixture of molecules of different mass is possible and in, for example, the case of uranium the separation of isotopes of vapor derived directly from uranium hexafluoride in its solid form is possible.

Time-of-flight separation is basically a mechanical analog of the diffusion barrier. As a cloud of gas moves through an evacuated region, the faster moving lighter particles concentrate toward the outer portion of the beam configuration which when collected is, therefore, enriched in the lighter particles. Similarly, the inner portion would be depleted in the lighter particles when collected. However, a continuous and stationary source beam would not give rise to separation as the inner portion of one layer of cloud is equivalent to the outer portion of the subsequent layer of clouds. In previous proposals a chopper for the beam is required to cut the beam into individual layers and extensive pumping is needed to evacuate the system to a sufficiently high level of vacuum to maintain the integrity of the molecules during their time of flight. In 1942, E. Bagge published a paper (entitled "Concerning the Possibility of Enriching the Light Isotope of Uranium of Means of the Isotope Sluice" in Deutsche Forschungbericlte), utilizing synchronized choppers, collectors and powerful pumps. A cascade of such time-of-flight units was constructed to separate the uranium isotope. However, the necessity of operating the system at a very low gas pressure and the limited efficiency of collection proved to be a major drawback and resulted in a very low throughput and a very high consumption of pumping energy.

As disclosed in an article entitled "The Gas-Separating Chamber, System "Bagge". "by Von K. Diebner, on pages 417 and 418 of Volume 5 of the Publication "Kerntechnik" in 1963, it has been proposed to separate gaseous isotopes by cutting a stream of gas into discrete clouds, moving these discrete clouds through an evacuated space and after a predetermined time during which the forefront of the cloud will be enriched in lighter molecules, utilizing a rotating collector to separate the head of the cloud from the main body of the cloud. Such an arrangement is inefficient in view of its collection only of a small portion of the enriched outer surface of the cloud and because the apparatus can only deal with separate discrete clouds of gases rather than a continuous stream such as that which can be handled by the process and apparatus of the present invention by virtue of the use of co-rotating nozzles and collectors.

In addition a stationary nozzle and collector arrangement has been proposed by E. W. Becker for the separation of gaseous isotopes and the nozzle and collector of this arrangement are generally known respectively as the "Becker nozzle" and "Becker collector". The "Becker arrangement" as originally proposed gives rise to very limited separation and, even with development, has never given rise to separation constants of sufficient magnitude to render the process a practical and economical proposition.

It is an object of the present invention to provide a method and apparatus for separating gaseous isotopes in which the specific power requirement is comparable with that of a diffusion process, the separation constant can be made substantially higher than that of the diffusion process, the centrifugal force required is two or more orders of magnitude lower than that of previously proposed centrifuge methods and the apparatus serves as a centrifugal pump to provide an evacuation sufficient for the necessary separation efficiency to be achieved.

The present invention differs from the prior art proposals by providing a co-rotating combination of nozzle and collectors and while the present invention is a variation of the time-of-flight process it differs materially in concept, practical application and effectiveness from previously proposed forms of the process.

According to one aspect of the present invention there is provided a process for separating gaseous mixtures of molecules of different mass comprising the steps of: causing a rotating means to eject a contiguous plurality of successive groups of molecules into an evacuated space to form a continuous stream of said mixture; allowing the molecules of each said group of molecules to move in accordance with their thermal velocities for a predetermined period of time following ejection, thereby to allow each said group of molecules to form a generally spherical configuration the outer radius of which will be enriched, in molecules of lighter mass, relative to lesser radii; and using a collector means co-rotating with said rotating means to collect molecules, which have been allowed to move for said predetermined period of time in accordance with their thermal velocities, from at least one desired portion of said stream.

According to another aspect of the invention there is provided an apparatus for separating gaseous mixtures of molecules of different mass comprising: a vacuum chamber; a nozzle supported within said chamber, arranged for rotation about an axis normal to its emitting axis and arranged to discharge a stream of said mixture into said chamber; and collector means spaced from and arranged to co-rotate with said nozzle, said collector means being positioned relative to said nozzle to collect a desired portion of said stream when the molecules of said stream have been permitted to move in accordance with their thermal velocities for a predetermined period of time following their discharge from said nozzle.

The theory of the present invention, and a process and apparatus embodying the present invention will now be described, by way of example, with reference to the accompanying drawings, in which.

Although the present invention is applicable to all gaseous isotopes and gaseous mixtures of molecules of different mass, it will be described in the following description with reference to uranium hexaflouride [$UF_6$].

Figure 1:
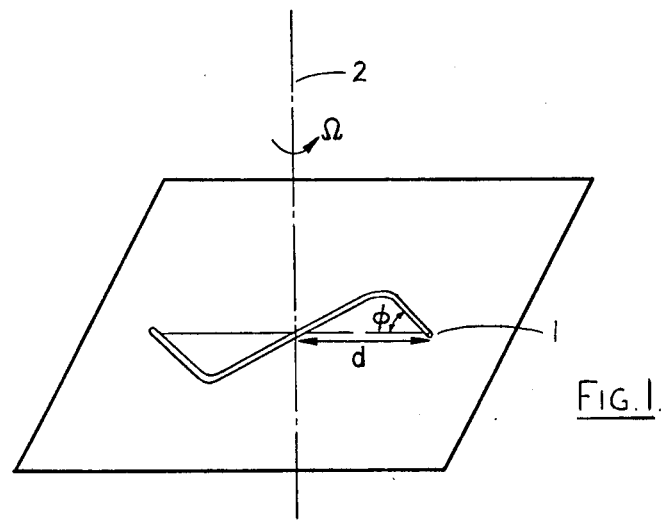
FIG. 1 is a diagrammatic representation of two identical symmetrically opposed rotating nozzles.
Figure 2:
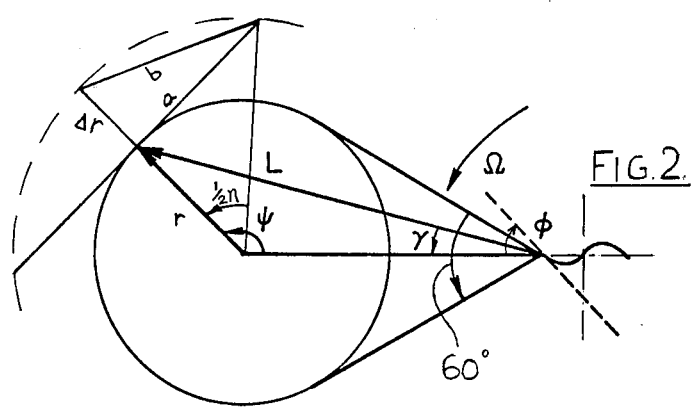
FIG. 2 is a diagrammatic representation of trajectories of molecules in a gas jet leaving a nozzle shown in FIG. 1.

In accordance with the theory of the present invention gas molecules are directed into an evacuated chamber through a rotating supersonic nozzle 1 having an angular velocity $\Omega$ about an axis 2 (FIG. I). The nozzle has a retarding angle $\phi$ relative to their radial direction so that the ejected molecules of gas travel in a straight line if there is no thermal spread, this is represented by:

$$v_i \sin\phi = \Omega d$$

$$\phi = \sin^{-1}(\Omega d/v_i) \tag{1}$$

where $v_i$ is the injection velocity and $d$ is the radial dimension of the nozzle from the axis 2. Following ejection from the nozzle 1, the gas molecules would spread out into a fan shape due to their thermal velocities (FIG. 2), and assuming that the gas molecules are monoenergetic at a mean speed $v_o$ as well as isotropic in their spatial angles, as indicated in FIG. 2, $$v_i/v_o = R/r$$

and $$L = (R^2 + r^2 - 2 R r \cos\psi)^{1/2} \tag{2}$$

$v_i$ is greater than $v_o$ to prevent back flow (L < O). Note that if $v_i = 2 v_o$, $\theta_o = 60°$, there can be as many as six nozzles operating simultaneously in the same plane of rotation in a chamber. The time of flight t for all the gas molecules is, $$t = R/v_i \tag{3}$$

and the angular delay $\beta$ for the co-rotating collectors relative to the nozzles, radial injection line is, $$\beta = \Omega t = \Omega R/v_i \tag{4}$$

With the light molecules traveling faster, and with $m v_o^2/2 = 4 k T/\pi =$ constant for constant temperature $T$, $$\Delta v = -\Delta m \, v_o/2m = -(2 kT/\pi m)^{1/2} \Delta m/m. \tag{5}$$

For other ranges of velocity, due to the Maxwellian relationship that $m v^2$ always appear together, also in general $\Delta v/v = -\Delta m/2m$.

The extra distance $\Delta r$ covered by the light molecules is, $$\Delta r = \Delta v \, t = -\Delta m \, v \, R/2 \, m \, v_i = 0.426\% \, v \, R/v_i. \tag{6}$$

Figure 3:
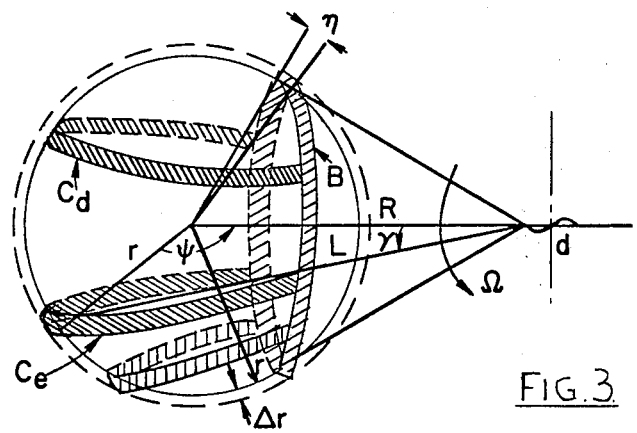
FIG. 3 is a schematic illustration of the relationship between population fronts of the spherical front of a gas jet from a nozzle as shown in FIG. 1 and the position of collectors.

Traveling along a collisionless straight trajectory for time $t$ after they left the nozzle, the thermo-velocity of the molecules carry them into exactly a spherical surface with radius $r = v_o t = v_o R/v_i$. Since each molecule also carries its original injection velocity $v_i$, the trajectories form the shape of an "ice cream cone", with the spherical surface of the "ice cream ball" being their physical location. From Eq. (6), the light molecules have a larger ball radius, and the objective now is to skim the surfaces of the ball most effectively in order to collect a substantial portion of the separated concentrations. The most direct way is a annular slit (The Becker Collector B) placed at the interface of the cone and the ball (FIG. 3). The collector B is to skim off the outmost population whose concentration is enriched in the light component.

The fractional area $A_B$ covered by the Becker collector is, $$A_B = \eta/\pi,$$

where $\eta$ is the angular width.

. Angular width $\eta$ is derived as follows with reference to FIG. 2, let $$a^2 = (r + \Delta r)^2 - r^2 = 2 r \Delta r + \Delta r^2$$

$$b^2 = a^2 + \Delta r^2 = 2 \Delta r (r + \Delta r)$$

$$= 2 (r + \Delta r)^2 - 2(r + \Delta r)^2 \cos(\tfrac{1}{2}\eta),$$

or $$\cos(\tfrac{1}{2}\eta) = r/(r + \Delta r) + (1 + \Delta r/r)^{-1}$$

$$\simeq 1 - \Delta r/r,$$

so $$\eta = 2\cos^{-1}(1 - \Delta r/r).$$

Let $\eta = 2\cos^{-1}(1 - \Delta r/r)$, (7)

then from Equation (7) the fractional area
$$A_B = \eta/\pi = 2/\pi \cos^{-1}(1 - \Delta r/r). \tag{8}$$

Figure 4:
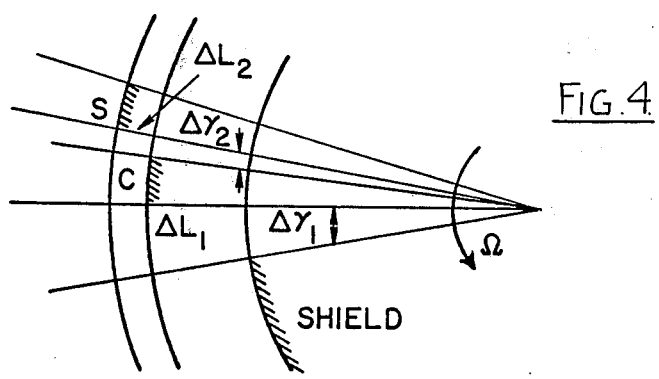
FIG. 4 is a schematic outline of a collector and shields.

As shown in FIG. 3, the Becker collector is placed rather closely to the injection nozzle, and therefore it is relatively stationary to the gas jet. The inner radius of the collector B's co-axial wall is placed at $\simeq 1.1r$ while the outer wall is placed rather far away, say at $\simeq 1.5r$ in order to allow a sufficient opening of the slit to collect the light component effectively. As for the gas molecules that have by-passed the collector B, they form two spherical fronts at the forefront of the ice cream cone, and collectors C are designed to skim off part of that fronts. The population fronts are expanding radially (along L) outward, while the collector are rotating with a linear velocity $\Omega(L+d) \simeq \Omega L$. The motion of the collectors C is almost perpendicular to the motion of the gas molecules. The linear displacement of the gas molecules after time $\tau$ is $\Delta S = (v_o + v_i) L \tau/(R + r)$, while the difference in length of the collector along $L(\gamma)$, after rotating with angle $\Omega \tau$ is $\Delta L = L(\gamma) - L(\gamma + \Omega \tau)$, where $\gamma$ is the projection angle for L on the horizontal plane. If one of the collectors C is placed with all its projection angles $\gamma_o$ such that $\Delta S = \Delta L$, that is, if $$(v_o + v_i) L(\gamma_o) \tau/(R + r) = L(\gamma_o) - L(\gamma_o + \Omega \tau), \tag{9}$$

this collector would "CO-MOVE" with the population fronts. Now for collectors $C_e$ whose projection angle $\gamma > \gamma_o$, they would move faster than the population fronts "next-in-view", and can therefore skim away the outer population front without ever being caught up by the advancing inner population front. These collectors $C_e$ would collect the population enriched in light component. Similarly, collectors $C_d$ with projection angle $\gamma > \gamma_o$ would remain behind the population front next-in-view, and can therefore scoop away the depleted population front without ever catching up and mixing with the already by-passed enriched front. To simplify the design, some co-rotating shields are desirable to slice up part of the beam to ensure that the co-rotating collectors $C_e$ and $C_d$ never crossover into their respective non-designated fronts (FIG. 4). The shields may also be set to channel away as many as possible the unwanted gas molecules, including those uncollected stray molecules floating in the chamber. Supplementary collectors can be placed behind collectors $C_e$ and $C_d$ to collect the "left-over". As collectors $C_e$ collect enriched front, supplementary collectors $C_{ds}$ collect its depleted remains, similarly, as collectors $C_6$ collect the depleted portion, supplementary collectors $C_{es}$ now gather its enriched remains.

From Equations (6) and (8), the fractional area $A_B$ covered by the collector B is $$A_B = \frac{2}{\pi} \cos^{-1}\left(1 - \frac{v_o R}{v_i r} 0.426\%\right),$$

but
$$v_i/v_o = R/r \text{ in (2)},$$
so $$A_B = \frac{2}{\pi} \cos^{-1}(1 - 0.426\%) = \frac{2}{\pi} \frac{5°.2905}{57°.3}$$

$$= \frac{2}{\pi} 9.2346\% \cong 6\%. \tag{10}$$

If collectors $C_e$, $C_d$, and the supplementary collectors $C_{ds}$ and $C_{es}$ are made to cover the area of the spherical fronts at about twice that of $A_B$ each, then all of the collectors together would cover about one-half of the total population fronts. The dilution due to the Maxwellian spread will be considered below. Without optimizing the designing calculations, it is assumed for simplicity that the collecting area for all the collector is, $$A_B + A_{C_e} + A_{C_{es}} \simeq A_{C_d} + A_{C_{ds}},$$

so the cut of the process $\theta$ is, $$\theta \simeq \tfrac{1}{2}. \tag{11}$$

Note that the dimensions of the collectors C are sensitive to the change of $v_o$ or $v_i$, as $\Delta r/r$ is only a fraction of one percent, while that of collector B is buffered by a factor $\cos \theta_o$, and is therefore not so sensitive to the changes of the molecular velocities.

Figure 8:
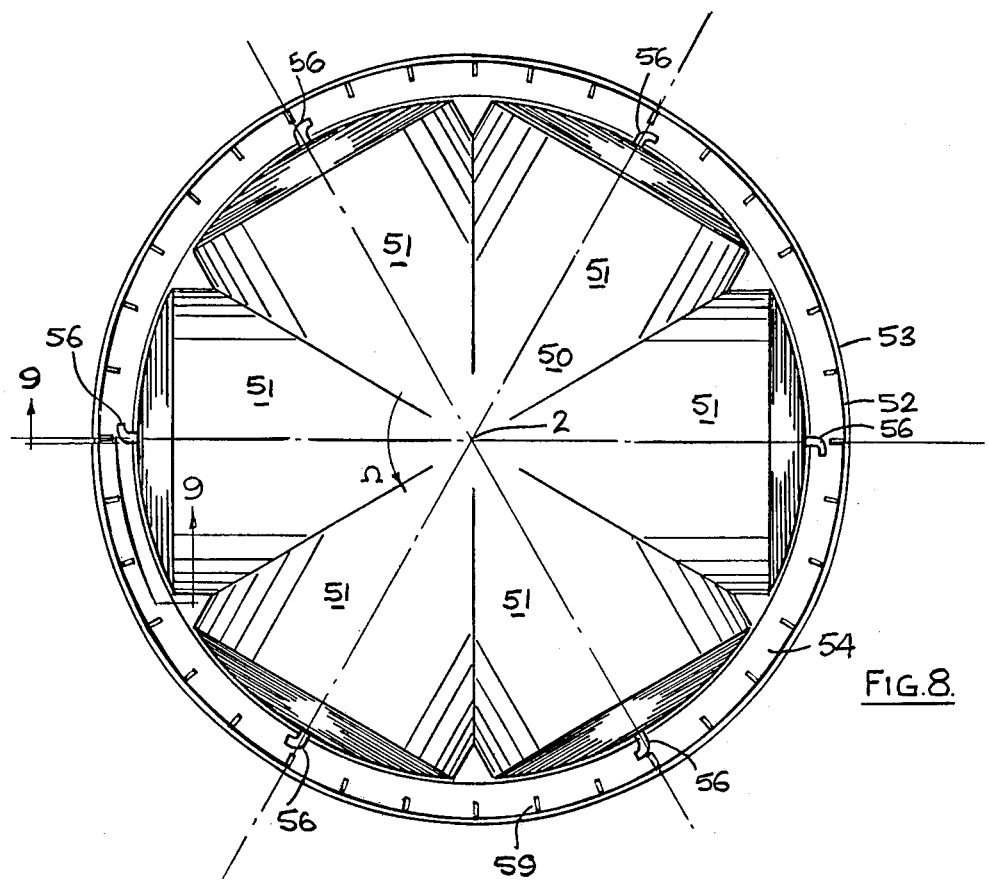
FIG. 8 is a diagrammatic plan view of a further embodiment of the present invention illustrating a centrifuge separating chamber having six ends symmetrically disposed in a plane of rotation; and each being similar to the end illustrated in FIGS. 5, 6 and 7 and the chamber being disposed in a stationary housing arranged to receive molecules from the six ends.
Figure 9:
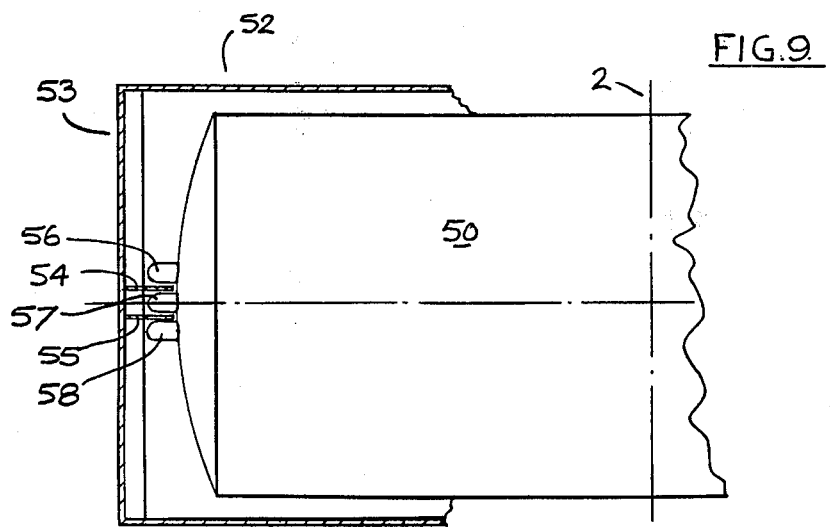
FIG. 9 is a fragmentary diagrammatic sectional elevation along section lines 9—9 shown in FIG. 8.

The heart of the present invention is the co-rotating nozzle-collector arrangement. The collectors and shields, when present, are travelling with a linear velocity $\Omega L > v_o + v_i$, so that the gas molecules collected are channeled outwardly by the centrifugal force away from axis 2. The gas pressure is such that the collected gas molecules are either channeled to the next stage of the separation process, or, if collected by the shields, are channeled back to the nozzle 1. The chamber has partition arrangements to channel the enriched, depleted, and to-be-recycled gas molecules (FIGS. 8 and 9).

The separation constant $\alpha$ of the present invention is variable at the design stage of the apparatus and is determined as follows.

Following the Maxwellian distribution, the normalized population density $n(v)$ is, $$n(v) = \frac{4}{\pi^{1/2}} \left(\frac{m}{2kT}\right)^{3/2} v^2 e^{-\frac{mv^2}{2kT}}, \tag{12}$$

where $\int_0^\infty n(v)\, dv = 1$, and $v_o = \int_0^\infty n(v)\, v\, dv = (8kT/\pi m)^{1/2}$ For $v' \geq v_o$, let $v^2 = v'^2 + u \cdot 2kT/m$, so the fractional population $n(v \geq v') =$ $$\int_{v'}^\infty n(v)\, dv = \frac{2}{\pi^{1/2}} e^{-\frac{mv'^2}{2kT}} \int_0^\infty (u + m v'^2/2kT)^{1/2} e^{-u}\, du$$

$$= \frac{2}{\pi^{1/2}} e^{-\frac{mv'^2}{2kT}} [\,(mv'^2/2kT)^{1/2} + \tfrac{1}{2}(2kT/mv'^2)^{1/2} - \tfrac{1}{4}(2kT/mv'^2)^{3/2} + \ldots\,]$$

$$\cong 0.40 \text{ for } v' \cong 1.1\, v_o,$$

and the separated fractional $\Delta n$ due to velocity difference $\Delta v$ is, $$\Delta n\,(v \geq v') \cong \frac{2}{\pi^{1/2}} e^{-\frac{mv'^2}{2kT}}\, 3/2^{1/2}\,(kT/mv'^2)^{3/2} - 2^{-1/2}\,(mv'^2/kT)^{3/2}$$

$$\cong -0.83\, \Delta v/v' \text{ for } v' \cong 1.1\, v_o. \tag{13}$$

Figure 10:
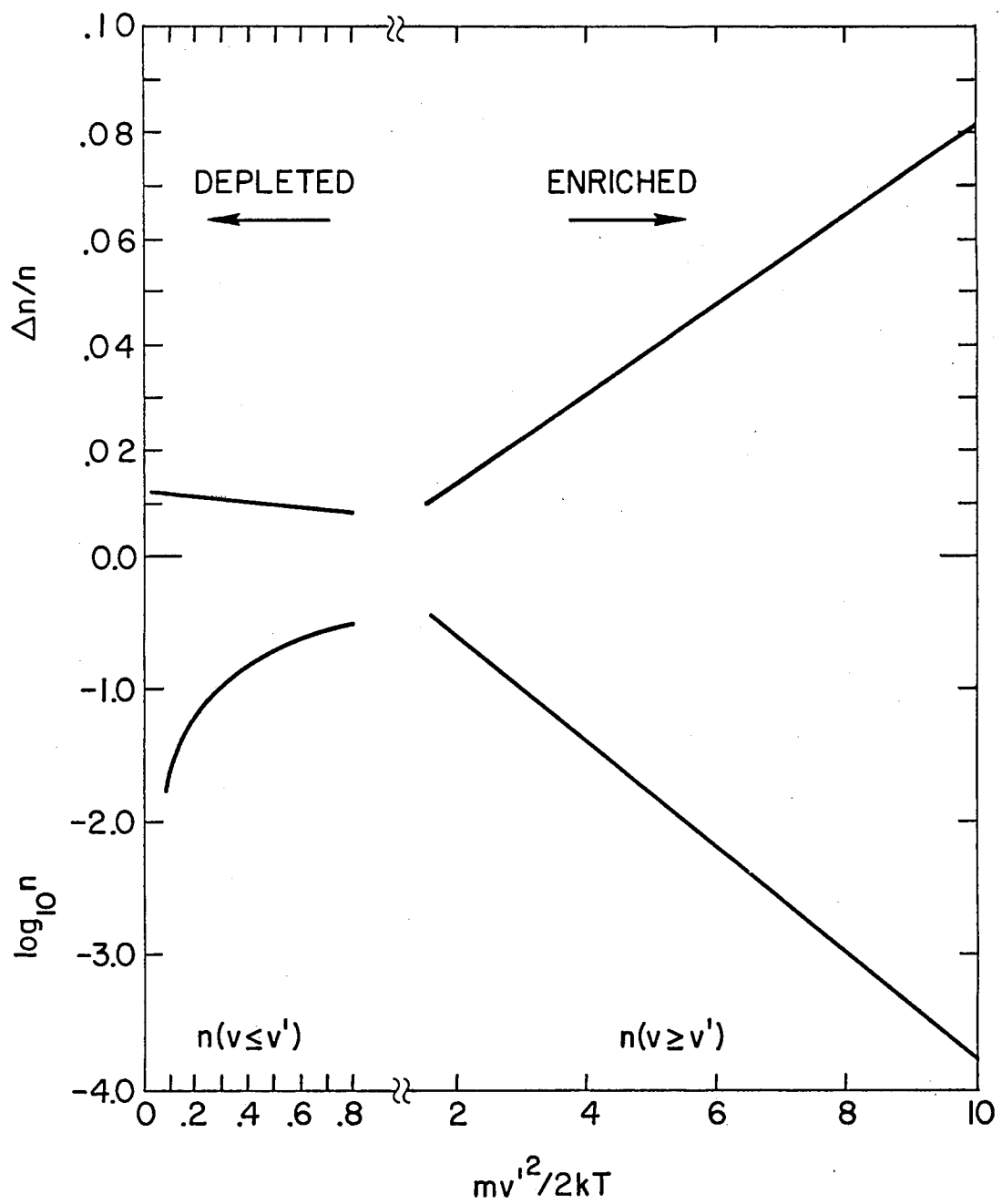
FIG. 10 is a graphical representation of the numerical results of the portion of the processed spectrum with their corresponding separation value.

Note that the negative sign in Eq. (13) indicates a reduction of the fractional population n due to the narrowing of the integration limit from $v'$ and $\infty$ to $v' + \Delta v$ and $\infty$. As far as the enrichment of light component is concerned, only the absolute value in Eq. (13) needs to be used (FIG. 10).

For $v' \simeq v_o$, a simple linear approximation for the separated fractional $\Delta n$ gives, $$\Delta n(v_o \pm \Delta v/2) \cong \frac{8}{\pi^{1/2}} (m/2kT)^{3/2}\, v_o^2\, e^{-\frac{mv_o^2}{2kT}}\, (1 - mv_o^2/2kT)\Delta v_o/v_o = 0. \tag{14}$$

For $v' \leq v_o$, the fractional population $$n\,(v \leq v') = \int_0^{v'} \frac{4}{\pi^{1/2}} (m/2kT)^{3/2}\, e^{-\frac{mv^2}{2kT}}\, v^2\, dv$$

$$= \frac{4}{\pi^{1/2}} (m/2kT)^{3/2} \int_0^{v'} [\,1 - mv^2/2kT + \tfrac{1}{2}(mv^2/2kT)^2 - \cdots\,]\, v^2\, dv$$

$$\cong \frac{4}{\pi^{1/2}} (mv'^2/2kT)^{3/2}\left[\,1/3 - \frac{mv^2}{2kT}\frac{1}{5} + \left(\left(\frac{mv'^2}{2kT}\right)^2 \frac{1}{14}\right)\frac{2}{3}\,\right]$$

$$\cong 0.40 \text{ for } v' \cong 0.88\, v_o,$$

and the separated fractional $\Delta n$ due to velocity difference $\Delta v$ is, $$\Delta n\,(v \leq v') \cong \frac{4}{\pi^{1/2}} (mv'^2/2kT)^{3/2}\,[1 - mv'^2/2kT + (1/2\,(mv'^2/2kT)^2)2/3]\Delta v/v'$$

$$\cong 0.74\, \Delta v/v' \text{ for } v' \cong 0.88\, v_o. \tag{15}$$

Averaging over different portions of the population distribution, from Eq. (5), $\Delta v/v = \Delta m/2m = 0.426\%$ for $UF_6$, Eqs. (13), (14), and (15) become $$\Delta n/n\,(v \gg v_o) = 2.1\, \Delta v/v = 0.884\%, \tag{16}$$

$$\Delta n/n\,(v \simeq v_o) \simeq 0, \tag{17}$$

$$\Delta n/n\,(V \gg v_o) = 1.85\, \Delta v/v = 0.788\%, \tag{18}$$

and normalizing to their respective weight of the population distribution while avoiding $v \simeq v_o$ (FIG. 10), $$\overline{\Delta n} = (0.884 + 0.788)/2 = 0.836\% \tag{19}$$

Let $y$ be the enriched stream, $x$ the depleted stream, $\theta$ the cut of separation, then $y = \theta(1 + \Delta n)$, $x = (1 - \theta)(1 - \Delta n)$, and from $$\alpha \equiv \left(\frac{y}{1-y}\right) \bigg/ \left(\frac{x}{1-x}\right),\; y - x \simeq (\alpha - 1) \times (1 - x),$$

where $\alpha$ is the separation constant, then ignoring terms with $\overline{\Delta n}^2$, $$\alpha \simeq \frac{\overline{\Delta n}\,[\,(1 - 2\theta)(1 - \theta) + 1\,] - \theta^2 + 3\theta - 1}{[\overline{\Delta n}\,(1 - 2\theta) + \theta](1 - \theta)}, \tag{20}$$

and with $\theta \simeq \tfrac{1}{2}$ from Eq. (11), $$\alpha \simeq 1 + 4\overline{\Delta n} \simeq 1.03344 \text{ for } UF_6. \tag{21}$$

This value is higher than the theoretical limit of the diffusion process where $\alpha_{diff} = 1.00429$. It is assumed here that the entire population is carried off by the designated collectors. In reality, there may be some "stray molecules" who would rain on whichever co-rotating exit they happen to hit upon and cause a dilution of separation. On the other hand, $\overline{\Delta n}$ in Eq. (19) is only considered in an averaged way, and this value can be substantially increased when the collectors are designed to collect the enriched stream in a more selective way, for example, by employing the high energy maxwellian tail alone as shown in FIG. 10, can be increased to that of total separation.

In the calculation of the separation constant $\alpha$, it has been assumed that as soon as the gas leaves the nozzle 1, the molecules move apart with their individual thermal velocities without collision. However, the collisional frequencies decrease only linearly versus pressure as the gas expands in the chamber, and each collision would cause a dilution to the time-of-flight separation. This factor of dilution has not been calculated due to the "few-scatterings". This factor may be measured experimentally with a known chemical mixture whose difference of chemical weight is rather close to that of the isotope in question, and whose chemical properties are easily distinguished upon separation, or an experiment with the gaseous isotope which are also radioactive may be used, the counting rate of the radioactivity acting as a measure of the "value-of-separation" that each chamber-stage has enchanced. For the purposes of this description of the theory of the invention, it is assumed that $\alpha$ in Eq. (21) is a reasonable approximation.

In order to estimate throughput and power requirements, it is necessary to assign reasonable dimensions to the theoretical model described above. With reference to the drawings, let $D = R + r \simeq 150$ cm, and let the angular velocity $\Omega = 2\pi + 30$ cps so that the linear velocity of the collectors is $v_c \simeq \Omega R \simeq 2.8 \times 10^4$ cm/sec, and $v_c > v_0 = 1.33 \times 10^4$ cm/sec for $UF_6$. The efficiency of the pumping action due to the pressure gradient created by the centrifugal force is high, as the Boltzman factor $\exp(-0.5\, mv_c^2/kT) = \exp(-5.8) = 1/346$. The mean free path $\lambda$ is related with the number density n of the gas molecules by $$\lambda^{-1} = \sqrt{2}\, n \pi d^2 \qquad (22)$$

where $d$ is the scattering cross-section of the molecules. $d \simeq 6$ A for $UF_6$. For $\lambda \simeq D \simeq 150$ cm, the gas pressure $P_o$ at room temperature is $$P_o = nkT = \frac{kT}{\sqrt{2}\, \lambda \pi d^2} = 1.75 \times 10^{-2}\, \text{dyne/cm}^2 \simeq 1.7 \times 10^{-8}\, \text{atm}. \qquad (23)$$

This vacuum level $P_o$ is maintained at locations near the collectors. Due to the centrifugal pumping action, once the molecules are caught by the collectors, the gas pressure is raised by the factor $0.5\, mv^2/kT = 5.8$, so the pressure becomes $0.1$ dyne/cm$^2$, or $10^{-7}$ atm. The number of gas molecules N flow through the processing chamber per second is now, at $v_i = 2v_0$, $P = P_o$, N = $6 \times v_i \times n \times \pi (D/2)^2 = 1.2 \times 10^{21} = 0.7$ grams
of $UH_6 = 0.475$ grams of U, or 15 metric ton per year.

The collectors carry only half of this value, so the THROUGHPUT or uranium is,

THROUGHOUTPUT = $15 \times 0.5 = 7.5$ ton/year. (24)

Power requirement for the collectors and the shield to do the pumping action is, POWER = $\tfrac{1}{2}mv^2/\text{sec} = 1.2 \times 0.7 \times 8 \times 10^8\, \text{erg/sec} = 28$ Watts. (25)

By balancing pressure and flow energies, the nozzle diameter $\simeq 0.5$ cm, then, from the equation of continuity, the number of molecules collected by the collectors and shields is the same as that passing through the nozzle, and since the gas pressure is proportional to the number density, the pressure of the nozzle is now $$P_{nozzle} = P_o \times (150/0.5)^2 = 9 \times 10^4\, P_o,$$

and the additional power required to compress the gas pressure from that at the collectors to that at the nozzle is, POWER = $\frac{m}{M} R T \log (P_{nozzle}/5.8\, P_o)$ $= \frac{0.7}{352} \times 8.314 \times 10^7 \times 300 \times \log (1.55 \times 10^4)\, \text{ergs/sec},$ $= 20.7$ Watts, (26)

where R is the gas constant, M is the molecular weight of $UF_6$, and m is the mass flow in grams per second. This work can easily be carried by the pump which controls the gas flow.

The Unit-of-Separative-Work (USW) done for each stage is now
, USW = THROUGHPUT $\times (\alpha-1)^2/2 = 7.5 \times 10^3$
kg/year $\times (3.344 \times 10^{11/62})^2/2 = 4.19$ kg/year, and the specific power requirement is $$\frac{0.028 + 0.0207}{4.19} = 0.0116\, kW/kg\, \text{USW/yr}. \qquad (27)$$

This value in Eq. (27) is substantially lower than that of the theoretical minimum for the diffusion process (0.073 kW/kg USW/yr).

The rotating chamber is housed in a vacuum enclosure whose vacuum level is maintained at the average chamber pressure to minimize the pressure gradient across the chamber wall so that the diffusive leak from the chamber may be small enough to be ignored. The vapor pressure of $UF_6$ at room temperature is much higher than that of the processing chamber, so for $UF_6$ and for limited production, perhaps the material can be handled and stored in solid form and each processing chamber can therefore handle a variety of enrichment concentrations in order to reduce the number of total units for a given number of stage of separation. The stress of the material and power requirements have not been optimized in terms of the most efficient combinations of $\alpha$, $R+r$ and $\Omega$. For example, with a larger value of $R+r$, while the rotational speed of the slit remains about constant at $2v_0$, the centrifugal force $\propto (2v_0)^2/R \simeq (2v_0)^2/R+r$, is now reduced and therefore the stress of the chamber is also reduced. Also with a larger $R+r$, the larger spatial separation of the population fronts will reduce interference by the structure defining the collector thereby increasing the collecting efficiency and reducing the power requirement.

Figure 5:
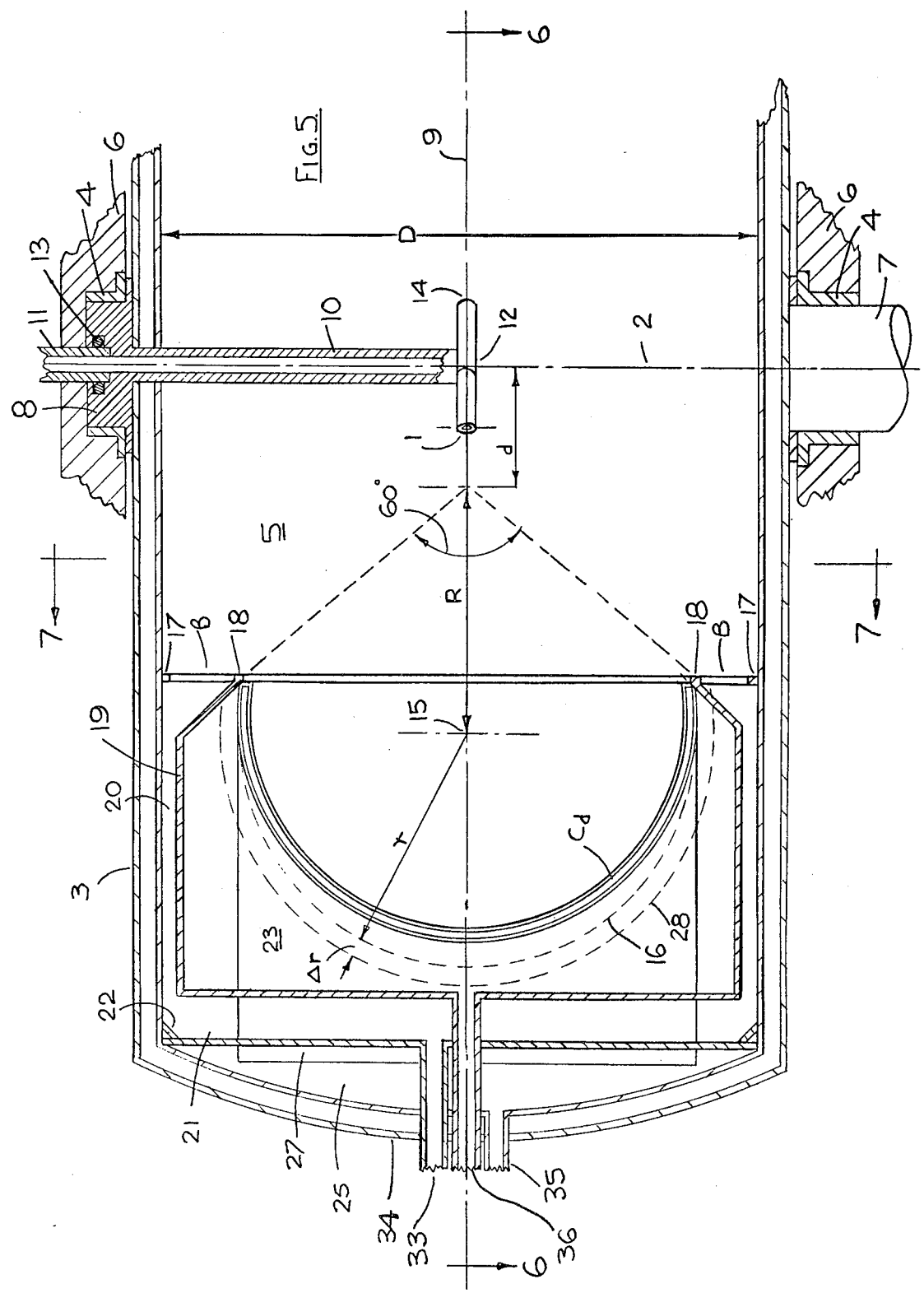
FIG. 5 is a diagrammatic sectioned elevation along section lines 5—5 shown in FIGS. 6 and 7 showing one end of a centrifuge separator chamber for separating gaseous isotopes; the other end of the chamber being identical with and symmetrically opposed in mirror image to said illustrated end.
Figure 6:
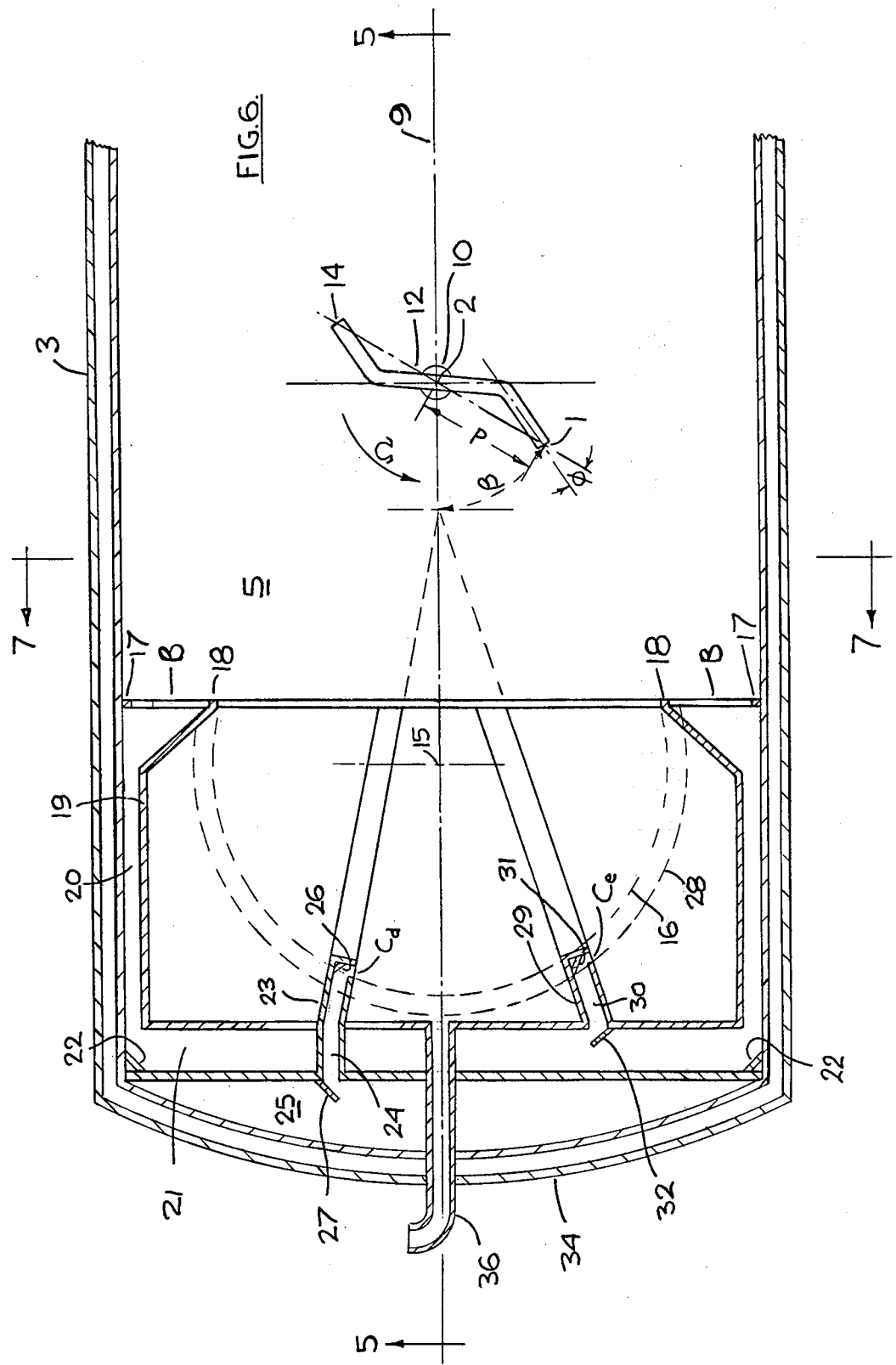
FIG. 6 is a diagrammatic sectional plan view of said chamber along section line 6—6 shown in FIGS. 5 and 7.
Figure 7:
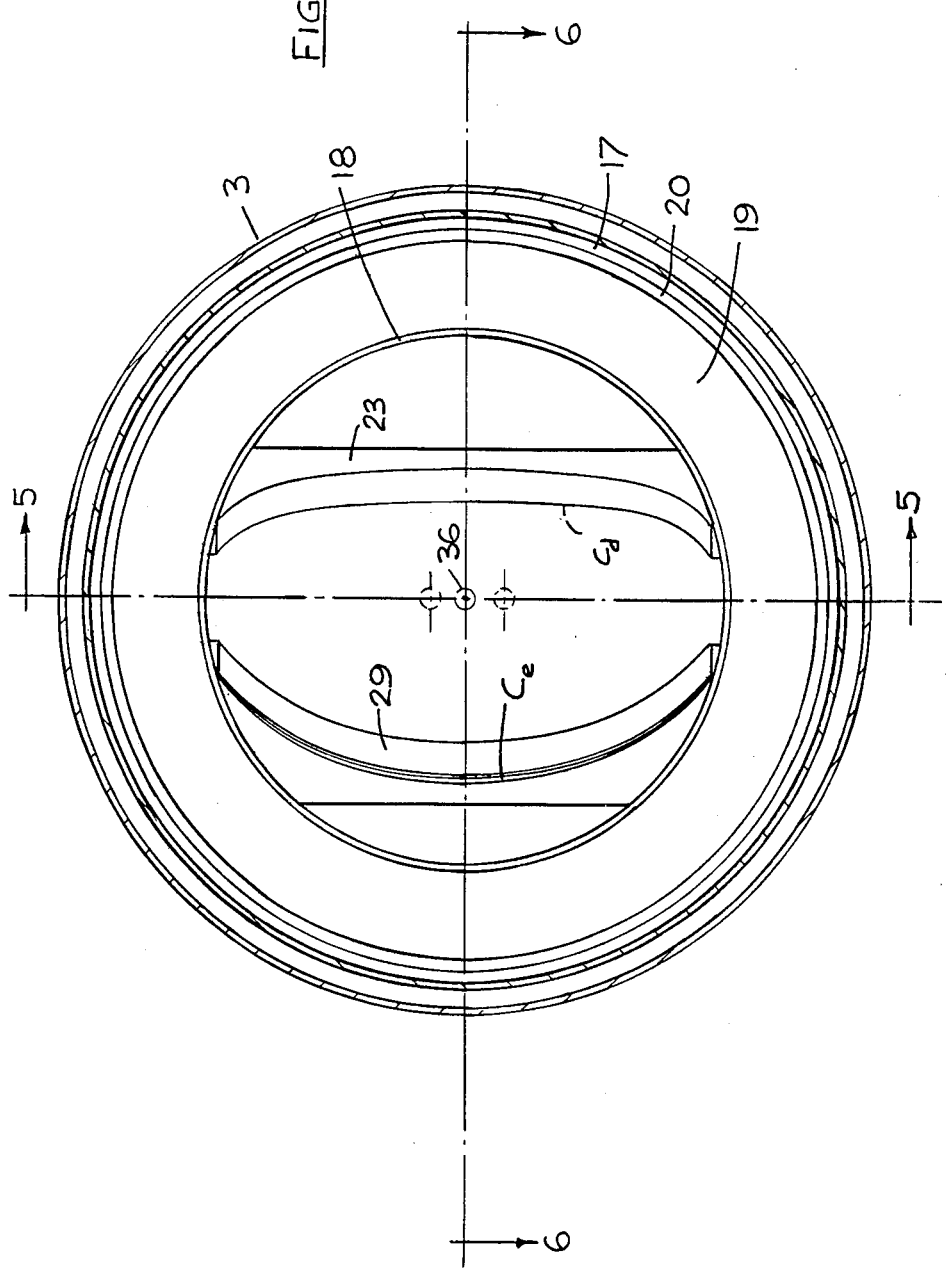
FIG. 7 is a diagrammatic sectional elevation along section lines 7—7 shown in FIGS. 5 and 6.

FIGS. 5, 6 and 7 illustrate, in diagrammatic form, one end of a symmetrically double ended evacuated rotatable chamber 3. Chamber 3 is an elongate double walled chamber of circular cross-section mounted for rotation in bearings 4 about an axis of rotation 2. The space between the double walls of the chamber 3 is evacuated to facilitate adequate sealing of the chamber for the maintenance of a vacuum in the interior 5 of the chamber.

Bearings 4 are supported in a structure 6 which remains stationary when the chamber is rotated. The chamber is supported in the bearings 4 by a shaft 7 and a spigot 8, both of which are disposed on the axis 2 and rigidly attached to respectively the bottom and the top of the chamber 3. Rotation of the chamber 3 is achieved by power transmitted from a suitable motor (not shown) through shaft 7.

Extending coaxially along the axis of rotation 2 from the top of the chamber 3 to longitudinal axis 9 of the chamber 3 is a tubular member 10, the interior of which, at its upper end, communicates with a supply tube 11 and, at the center of the chamber on the axis 9, with a nozzle arrangement 12. The supply tube 11 is maintained stationary with respect to structure 6, the tubular member 10 is integral with the spigot 8 and leakage between the supply tube 11 and the spigot and tubular member combination 8, 10 is prevented by a seal 13 disposed between the spigot 8 and the lower end of the supply tube 11.

The nozzle arrangement lies in the central plane of rotation of the chamber about axis 2 and consists of two symmetrically opposed nozzles 1 and 14. Nozzle 14 is a mirror image of nozzle 1 and is concerned with the end of the chamber 3 not shown in FIGS. 5, 6 and 7. Nozzle 1 is positioned to provide a stream of gas molecules received by way of the tubular member 10 to the end of the chamber which is illustrated in FIGS. 5, 6 and 7. Gas molecules passed to the nozzle arrangement 12 by way of the tubular member 10 are distributed equally for ejection by nozzles 1 and 14.

Nozzle 1 is disposed at a radius d from axis 2 and is arranged to eject molecules at an angle of lag $\phi$ with respect to the direction of rotation such that when the nozzle together with the chamber is rotated about axis 2 gas molecules emitted by the nozzle will travel in a straight line (i.e. they will have no angular component of velocity and will not rotate with chamber 3). Nozzle 1 is disposed with an angle of lead $\beta$, relative to axis 9, in the direction of rotation of the chamber 3 which is such that the median location of molecules ejected by nozzle 1 is at point 15 when the chamber 3 and nozzle 1 have rotated through angle $\beta$ about axis 2 at a rate of $\Omega$. Point 15 is the center of a spherical front 16 of expanding molecules defined by radius r and is at a distance of $R + d$ from axis 2 along the longitudinal axis 9 of the chamber 3.

Collectors $C_e$, $C_d$ and the Becker collector B are embodied in the chamber in the form of specifically positioned slits of specific dimension and shape. The slits are defined by metal walls and communicate by ducts with collecting areas for enriched groups of molecules and depleted groups of molecules. For the sake of clarity only one collector slit $C_d$, one collector slit $C_e$ and the Becker collector B are shown and described in the practical embodiment of this invention. However, it will be appreciated that in accordance with the theory of the present invention a plurality of collectors $C_d$ and $C_e$ may be utilized and that such a plurality may be of the order of two to three collectors $C_d$ and two to three collectors C for each nozzle in a chamber. In addition supplementary collectors $C_{ds}$ and $C_{es}$ may be utilized together with one or more shields as discussed in the above theoretical discussion of the present invention. In this connection it will be understood that shields S will be structurally similar to collectors $C_e$ and $C_d$ and will communicate with a collection area for groups of molecules which are not regarded as depleted or enriched and which may be returned to the nozzle arrangement for recycling.

The Becker collection B is an annular slit or opening disposed symmetrically in the chamber adjacent the outer wall of the chamber and facing longitudinal along the chamber toward the nozzle arrangement 12. The Becker collector B is positioned and dimensioned such that imaginary lines extending from any two diametrically opposed points on the inner edge of annular slit to a point on axis 9 a distance d from axis 2 substend an included angle of $\simeq 60°$. The Becker collector B is bounded by an outer metallic ring 17 attached to the interior of the inner chamber wall and by an inner annular ring 18 which forms the end of an annular duct wall 19 which together with the inner wall of the chamber defines an annular duct 20 extending longitudinally from the Becker collector B away from the center of rotation of the chamber 3 to a collecting area 21. The collecting area 21 extends across an entire cross-section of the chamber 3 and serves for the collection of enriched groups of molecules collected by the Becker collector B and the collector $C_e$. An annular angled deflector 22 is located at the junction of duct 20 and collecting area 21 and serves to deflect molecules from the duct 20 into the collecting area 21.

Collector $C_d$ is a slit, facing in the direction of rotation $\Omega$, of part circular configuration lying in a plane parallel to axis 2 and containing a point on the longitudinal axis 9 of the chamber 3 a distance d in a direction the collector from axis 2. The collector slit $C_d$ has a width of approximately 10 centimeters and coincides throughout its length with the spherical front 16 of depleted molecules. Collector $C_d$ is bounded by a metallic ducting structure 23 defining a duct 24 leading from the slit of collector $C_d$ to a collecting area 25 for depleted groups of molecules. A deflector 26 adjcent the slit of a collector $C_d$ serves to direct molecules entering the slit along the duct 24 to the collecting area 25, at the entrance of which is a further deflector 27 which serves to direct molecules from the duct 24 toward the center of the collecting ara 25. A number of other deflectors will be required in the arcuate arrangement of the collector $C_d$ in order to direct molecules entering the collector $C_d$ in a direction toward a collecting area 25. These additional deflectors are not illustrated but are of a nature and a position which will be readily apparent to any man skilled in the field to which this invention relates.

Collector $C_e$ is similar in construction to collector $C_d$, faces in the direction of rotation $\Omega$, is in a plane parallel with axis 2 and containing the same point on longitudinal axis 9 which the plane of the slit of collector $C_d$ contains. The slit of collector $C_e$ extends around the surface of a spherical front 28 which is coaxial with spherical front 16 and spaced outwardly therefrom by a distance $\Delta r$. The slit of collector $C_e$ is defined by a metallic structure 29 which also defines a duct 30. The duct 30 connects collector $C_e$ with the enriched collecting area 21. Deflectors 31 and 32 act to direct molecules collected by collector $C_e$ respectively along the duct 30 and toward the center of the enriched collecting area 21. As with collector $C_d$ a number of additional deflectors will be required for collector C All collectors $C_e$ and $C_d$ are positioned and shaped so that each of them will be in desired portion of the relavent spherical front 16 or 28.

An outlet tube 33 extends from the enriched collecting area 21 through the end 34 of the chamber 3 to permit passage of enriched groups of molecules in the enriched collecting area 21 from the chamber 3. Tube 35 extends from the depleted collecting area 25 to permit the passage of depleted groups of molecules from the depleted collecting area 25 to the exterior of the chamber.

Tube 36 extends from the interior of the chamber 3 through the end wall 34 and is arranged to permit passage of molecules not falling within the groups defined as enriched or depleted from the interior of the chamber to the exterior of the chamber. This latter group of molecules does not differ significantly from the molecules entering the chamber from the nozzle 1 and may be recylced through the chamber. These recycleable molecules would include those collected by shields in an arrangement in which appropriate shields are provided.

The exit tubes 33, 35 and 36 have longitudinal axes, each of which is normal to the axis 2, which are disposed in a vertically spaced apart relationship with one another. At the exterior of the chamber the tubes 33, 35 and 36 are each curved as shown in FIG. 6 in order that their exit is directed away from the direction of rotation $\Omega$.

FIG. 8 shows a chamber 50 having six equiangularly disposed identical ends 51 each having a substantially identical arrangement to that of the end of a chamber described above with reference to FIGS. 5, 6 and 7. In this connection it will be appreciated that when the included angle of the Becker collector B exceeds 60° the collectors B of adjacent chamber ends will partially overlap. The chamber 50 is arranged for rotation about an axis of rotation 2 in a similar manner to the chamber described with reference to FIGS. 5, 6 and 7. Within the chamber 50 is a nozzle arrangement (not shown) having 6 equi-angularly disposed nozzles each of which have the same characteristics as nozzle 1 described with respect to FIGS. 5, 6 and 7.

Surrounding the chamber 50 as shown in FIGS. 8 and 9 is a stationary housing 52 within which the chamber 50 rotates.

The housing 52 is of generally cylindrical form and comprises an outer structure 53 within which are disposed annular flanges 54 and 55. The annular flanges 54 and 55 extend radially inwardly from the outer structure 53 between the exit tubes 5, 57 and 58 of each of the ends of the chamber 50, which exit tubes correspond to the tubes 33, 35 and 36 described with reference to FIGS. 5, 6 and 7. The housing 52 is an evacuated structure and serves for the distribution of the enriched, depleted and recycleable groups of molecules which exit by way of the exit tubes and the annular flanges 54 serve to maintain the required separation between the three groups of exiting molecles. A plurality of raially inwardly extending flanges 59 disposed normal to the annular flanges 54 and 55 serve to reduce or eliminate co-rotation of molecules exiting from the chamber 50 with the chamber 50.

In the arrangement shown in FIGS. 8 and 9 enriched groups of molecules existing from tube 56 are passed by means (not shown) under the influence of the pumping action generated by rotation of the chamber 50 to the next separation stage which comprises an arrangement substantially similar to that shown while depleted groups of molecules exiting from tube 58 are returned to the preceding stage of separation which also is substantially similar to the arrangement shown. Recycleable groups of molecules exiting from tube 57 are conveyed, again under the influence of the centrifugal pumping action resulting from rotation of chamber 50 to the inlet (not shown) of chamber 50, which inlet is substantially similar to the arrangements described with respect to FIGS. 5, 6 and 7 for the introduction of molecules to the nozzle arrangement 12.

It will be appreciated that a single chamber arrangement as above described may be utilized in a series of separating operations to provide the desired purity of a desired isotope. It will also be appreciated that a chamber arrangement as described above may be but one of a series of similar chamber arrangements each dealing with increasingly enriched groups of molecules from the inlet end of the arrangement to the exit end of the arrangement at which the enriched groups of molecules exiting have a desired degree of purity.

It will also be appreciated that the apparatus described is not restricted to the separation of isotopes but may be used to separate any gases the molecules of which have different masses.

A set of typical values for apparatus suitable for separating isotopes of $UF_6$ at ambient temperature are: chamber diameter, $D = 150$ cm; mean distance of travel for the molecular sphere, $R = 100$ cm; radius of the molecular sphere at collection, $r = 50$ cm; linear velocity for the collectors, $v_c \simeq 2.8 = 10^4$ cm/sec; injection velocity from the nozzle, $v_i = 2.66 = 10^4$ cm/sec; mean thermal velocity of the molecules, $v_o = 1.33 = 10^4$ cm/sec; angular velocity at 30 r.p.s., $\Omega = 188.5$ radians/sec; mean velocity difference due to isotopic difference in mass, $\Delta V_o = 108$ cm/sec; relative mass difference, $\Delta m/m = 3/352$; mean separation between the two spheres, $\Delta r = 0.406$ cm; distance from a point a distance $d$ from axis 2 to the collectors, $L = 86.6$ to 150 cm; time of travel of molecules in the chamber, $t = 3.759 = 10^{-3}$ sec; radius of the nozzle from axis of rotation, $d = 10$ cm; diameter of the nozzle opening = 0.5 cm; retarding angle of the nozzle, $\phi = 4.064°$; angle of lead of the nozzle from axis 9, $\beta = 40.6°$; mean free path of the gas molecules, $\lambda = 150$ cm; mean gas pressure, $P_o = 1.7 \times 10^{-8}$ atm; "cut" of the separation, $\theta = \frac{1}{2}$; separation constant, $\alpha = 1.03344$ fractional area covered by collector B, $A_B = 6\%$.

The process according to the present invention will now be described with reference to the theoretical discussion above and to the apparatus described in FIGS. 5, 6 and 7. For the purposes of this process a discrete group of molecules simultaneously ejected from nozzle 1 will be considered. In this connection it will be appreciated that in practical operation a continuous stream of molecules will be ejected from the nozzle 1 and that this continuous stream corresponds to a very large plurality of contiguous ejections of discrete groups of molecules such as the group that will be discussed.

The discrete group of molecules is a mixture of molecules of different mass and is ejected with zero angular momentum into the chamber 3 which has a rotation of $\Omega$ about axis 2. The gas molecules are ejected from the nozzle 1 at supersonic velocity and have a mean path of travel which is radially outwardly from axis 2 such that when the chamber has rotated through angle $\beta$ following ejection of the group of molecules, the group of molecules will be centered at point 15. Immediately upon leaving the nozzle 1 the group of molecules expand in the evacuated interior 5 of the chamber 3, by virtue of their thermal velocities, to form a spherical distribution of molecules. The molecules of lower mass have higher thermal velocities and, consequently, tend to form a spherical distribution of greater radius than the molecules of greater mass.

When the group of molecules is centered on point 15 the molecules of greater mass have a mean radius of $r$ and the molecules of lighter mass have a mean radius of $r + \Delta r$. The molecules of radius $\leq r$ are depleted in light molecules and the spherical surface at radius $\leq r$ is the depleted sherical surface. The molecule distribution at radius $\geq r$ is enriched in molecules of lighter mass and is the enriched spherical surface.

As the group of molecules passes through the opening surrounded by the Becker collector B an annular outer portion of the enriched spherical surface passes into the annular slit of the Becker B and from there by way of annular duct 20 to the enriched collecting area 21. The remainder of the group of molecules passes through the opening bounded by the Becker collector 3 and when centered at point 15 is subjected to collection of molecules from the enriched spherical surface by collector $C_e$ and to collection of molecules from the depleted spherical surface by collector $C_d$.

The velocity of the collectors $C_d$ and $C_e$ due to their co-rotation with the chamber 3 is sufficiently high relative to the velocity of the group molecules leaving the nozzle 1 that the group of molecules when centered at point 15 may in substance be regarded as stationary during the collection process. The collectors $C_d$ and $C_e$ and supplementary collectors and shields, when present) are positioned to skim molecules from one or other of the enriched or depleted spherical surfaces, as desired, with the molecules from the enriched spherical surface being conducted to the enriched collecting area 21, the molecules from the depleted spherical surface being conducted to the depleted collecting area 25 and molecules collected by shields and any molecules remaining in the chamber after the collection process being conducted from the chamber by the tube 36 for recycling through the chamber.

The collection of molecules in the group by all collectors occurs in substance simultaneously and instantaneously with the collectors then immediately proceeding to collect molecules from the next succeeding contiguous group of molecules.

Motion of the molecules through the chamber, ducts, collecting areas and tubes is by centrifugal force and centrifugal force can provide the basic pumping action necessary for operation of the present invention.

The pumping action of the chamber provides a substantial proportion of the necessary gas pressure for collection and distribution of collected molecules by and through the housing 52 to subsequent stages in the separation process.

With reference to FIG. 10, the upper portion of the graph is the separation value $\Delta n/n$ plotted against the fractional population collected $[n(v \geq v')$ or $n(v \leq v')]$ represented by the threshold value of $nv'^2/2kT$. The lower portion of the graph is the log. of the fractional population collected. As can be seen from the graph, for $\theta \simeq \frac{1}{2}$, $\alpha \simeq 1+4 \Delta n/n$ can be made as large as that of total separation by concentrating on the high energy tail along.

If desired, preferential heating of the molecules of lower mass may be achieved by a laser arrangement, accomodated in the chamber near the axis thereof, which can be utilized because the process of the present invention preserves the original state of motion of the molecules as well as any motion which may be added by such preferential heating. This preferential heating will result in an increased separation between molecules of higher and lower mass.

I claim:

1. A time of flight process for separating gaseous mixtures of molecules of different mass comprising the steps of:

causing a rotating means to eject, in a plane normal to the axis of rotation of said rotating means, a contiguous plurality of successive groups of molecules into an evacuated space to form a continuous stream of said mixture;

allowing the molecules of each said group of molecules to move in accordance with their thermal velocities for a predetermined period of time following ejection, thereby to allow each said group of molecules to form a generally spherical configuration the outer radius of which will be enriched, in molecules of lighter mass, relative to lesser radii; and using a collector means co-rotating with said rotating means to collect molecules, which have been allowed to move for said predetermined period of time in accordance with their thermal velocities, from at least one desired portion of said stream, said collector means also serving as a pump to evacuate said evacuated space.

2. A process according to claim 1, wherein said rotating means is a nozzle directed to cause said stream to have zero angular momentum.

3. A process according to claim 1 further comprising using said collector means to separately collect molecules, which have been allowed to move for said predetermined period of time in accordance with their thermal velocities, from the outer radius of said spherical configuration formed by each successive said group and molecules from a lesser radius of said spherical configuration formed by each successive said group thereby separately to collect a plurality of molecules enriched in said molecules of lighter mass from said outer radius and a plurality of molecules from a lesser radius which will be depleted in said molecules of lighter mass.

4. A process according to claim 3, wherein said collector means simultaneously and separately collects molecules from a plurality of separate discrete circumferential strips of the outer radius of said spherical configuration and from a plurality of discrete separate circumferential strips of a said lesser radius of said spherical configuration.

5. A process according to claim 1 further comprising the utilization of collector means consisting of a plurality of collectors each arranged to encompass a discrete circumferential strip of the surface of said spherical configuration at one of said outer radius and said lesser radii thereof.

6. A time of flight process for separating a heavier from a lighter component of a gas mixture, comprising:

discharging into an evacuated space a flow of the mixture through a nozzle rotating about an axis normal to its emitting axis so that each increment of flow from the nozzle is circumferentially displaced in space from the preceding increment due to rotation of the nozzle, thereby to produce successive wave fronts of the components moving outwardly away from the axis of rotation;

allowing movement of said components of the gas mixture for a predetermined period of time in accordance with their respective molecular thermal velocities, thereby to permit each wave front to form an outer front enriched in said lighter component and an inner front enriched in said heavier component;

providing a collector co-rotating with said nozzle and synchronizing the nozzle and collector so that the collector moves through a collecting position, when one of said fronts enriched in a said component arrives thereat, but is removed from said position, due to its rotation, when the other of said fronts enriched in a said component arrives thereat, so that only the gas in the front which is at the collecting position when said collector passes therethrough is collected by the collector, and utilizing rotation of the collector and nozzle arrangement to provide sufficient centrifugal pumping affect for conveyance of the mixture and sufficient evacuation for operation of the process.

7. Apparatus for separating gaseous mixtures of molecules of different mass comprising:

a vacuum chamber;

a nozzle supported within said chamber, arranged for rotation about an axis normal to its emitting axis and arranged to discharge a stream of said mixture into said chamber; and collector means spaced from and arranged to co-rotate with said nozzle, said collector means being positioned relative to said nozzle to collect molecules from at least one desired portion of said stream when the molecules of said stream have been permitted to move in accordance with their thermal velocities for a predetermined period of time following their discharge from said nozzle, said vacuum chamber being evacuated by pumping action of the rotation of said collector means.

8. Apparatus according to claim 7 wherein said chamber, nozzle and collector means are connected for co-rotation in unison.

9. Apparatus according to claim 7 wherein the emitting axis of said nozzle is directed such that said mixture discharged along said emitting axis has zero angular momentum.

10. Apparatus according to claim 7 wherein said collector means comprises at least one collector in the form of a slit facing in the direction of rotation of said collector and nozzle, said slit being coincident with a circumferential strip of a spherical front defined by molecules discharged by said nozzle after said predetermined period of time.

11. Apparatus according to claim 10 wherein said collecting means comprises a plurality of said collectors:

at least one of said collectors having a slit coincident with a circumferential strip of said spherical front which is formed by molecules enriched in one of said different masses after said predetermined period of time; and at least one collector having a slit coincident with a circumferential strip of a spherical front formed by molecules enriched in another of said different masses after said predetermined period of time.

* * * * *